April 9, 1957      E. E. RILEY      2,788,207
MOVABLE BOTTOM CINDER POT
Filed June 17, 1952      2 Sheets-Sheet 1
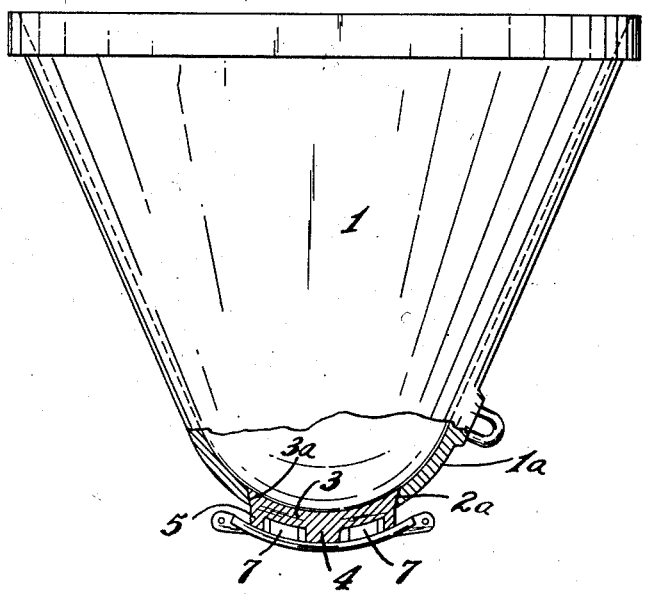
Fig. 1
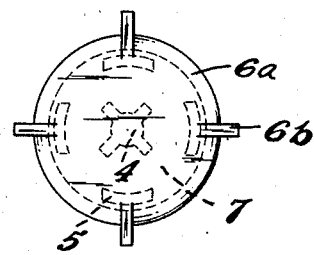
Fig. II
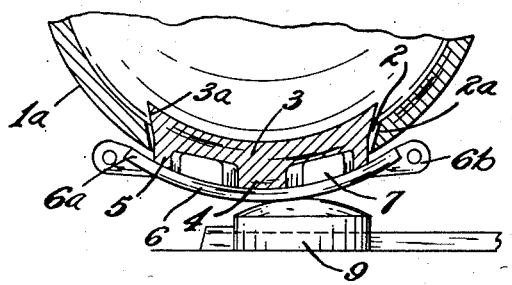
Fig. V
INVENTOR
Earl E. Riley
BY William B. Wharton
his ATTORNEY

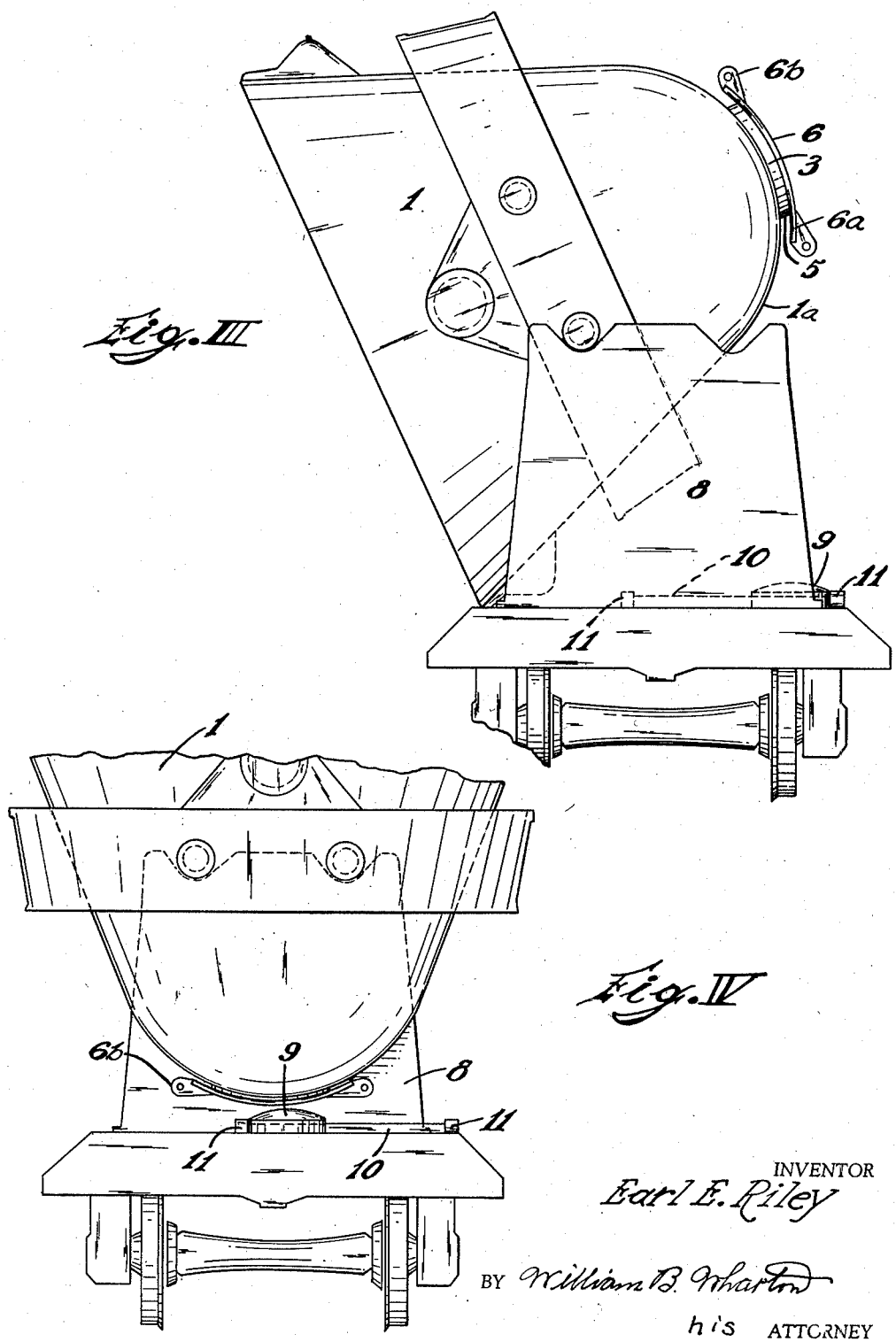

United States Patent Office 2,788,207
Patented Apr. 9, 1957

2,788,207

MOVABLE BOTTOM CINDER POT

Earl E. Riley, Pittsburgh, Pa.

Application June 17, 1952, Serial No. 293,937

1 Claim. (Cl. 266—39)

This invention relates to the so-called cinder or slag pots for receiving cinder and slag during iron and steel making operations and particularly to vessels of that sort constructed to avoid the destructive results caused by the adhesion of substantial masses of congealed slag in the lower region of the vessels or by the adhesion or welding of iron or steel percolated from the slag with the bottom wall of the vessel.

The vessels known as cinder pots or slag pots are formed as massive castings of ferrous metal and usually and most desirably are formed primarily as massive one-piece castings. In use either in conjunction with a blast furnace or open-hearth furnace such vessels receive slag which is slopped off from the ladle or other initial receptacle for molten metal from the furnace. The vessels which will hereinafter be generically termed "cinder pots," are dumped in some suitable place. Usually the cinder pots are conveyed to a slag disposal yard for dumping and usually the charge of slag has at least partially congealed before each pot is dumped. Although the upper and axial regions of the slag mass commonly is poured or falls readily from the cinder pot when the pot is tilted for dumping, a substantial "skull" of congealed slag frequently adheres to the pot wall in the lower region thereof and extends in greater or lesser thickness a substantial distance upwardly from the bottom of the pot. It may be explained initially that the cinder pots usually are transported to a slag disposal yard on rail-mounted carriages and have a trunnioned mounting in the carriages, as by means of a lifting ring provided with trunnions. The cinder pot is tilted for dumping by geared connection with a motor or by engagement with a crane hook. When the slag, iron or steel congealed in the bottom region of the cinder pot adheres stubbornly to the cinder pot wall, it may be necessary to resort to extreme measures for its removal. Such measures often involve cutting a hole in the bottom wall of the cinder pot and dropping the pot on a sturdy bar or ingot with which the skull of slag comes into direct contact. Such procedure frequently destroys the pot bottom and a destructive effect is particularly probable if the "sticker" includes or consists of a "button" of iron or steel which welds with the metal of the cinder pot. To cut off and scrap the cinder pot bottom and then to weld on a new bottom is an expensive and usually unsatisfactory procedure.

Various expedients to obviate or minimize these difficulties have been proposed or attempted, by providing a false bottom in the cavity, or bowl, of the cinder pot or by providing an opening in the cinder pot bottom with means normally to close the same.

In accordance with the present invention the cinder pot has a substantial area of its bottom wall omitted to provide a relatively extended bottom opening having a movable closure piece normally closing the same.

It is one object of the invention to provide a combination of that sort which is of simple construction, in which the closure piece for the bottom opening is not apt to be welded or frozen by slag or molten metal, which is readily unseated to exert detaching force on and admit air to the mass of slag in the cinder pot and which is self-seating under gravity to close the opening in the cinder pot bottom when it has been unseated.

Another object of the invention is to provide an assembly including a vessel as above indicated together with a carriage for transporting the same which not only mounts the cinder pot tiltably but which also comprises simple, massive means to force the bottom closure piece of the cinder pot inwardly of the cinder pot cavity a limited distance adequate to admit air and break the skull of slag loose from the inner surface of the pot.

In the accompanying drawings exemplary of the embodiment of my invention:

Fig. I is a view of the cinder pot, taken partly in elevation and partly in vertical section.

Fig. II is a bottom plan view of the movable closure piece for the bottom opening of the cinder pot.

Fig. III is an elevation of the cinder pot of my invention mounted in a railway carriage equipped to cooperate in assembly with the said cinder pot, the cinder pot being shown tilted into discharging position.

Fig. IV is an elevation of the assembly of cinder pot and carriage shown in Fig. III, the cinder pot being shown as returned to carrying position.

Fig. V is a detail view partly in elevation and partly in vertical section, illustrating the action of the closure piece for the bottom opening of the cinder pot as the pot is returned from discharging position to carrying position in the carriage of the assembly.

Referring to the drawings, reference numeral 1 designates the general structure of the cinder pot, in accordance with the most usual and in many ways most desirable practice the cinder pot being shown as a massive primarily one-piece casting. Although in most respects cinder pots of one-piece construction are more desirable than cinder pots made sectionally, regional destruction of such pots involves great difficulty in repair and frequently leads to the necessity for scrapping the entire mass of ferrous metal of which they are composed. As above explained the most vulnerable region of a cinder pot is the bottom region, injury to that region being resultant from the formation of "stickers" and also from overheating. Even in cinder pots of sectional construction, destruction of the bottom section of a cinder pot causes relatively great difficulty and expense. In meeting this problem, I omit a substantial area from the bottom wall 1a of the cinder pot to provide an extended bottom opening 2. Normally closing the bottom opening 2 there is a closure piece 3, which also is most desirably an individual one-piece casting of relatively massive construction. Closure piece 3 has an outwardly tapered fit with the edge 2a which bounds bottom opening 2, so that the closure piece seats under gravity without requiring any additional structure to produce or limit its outward movement in the opening.

Considering the form and arrangement of the closure piece 3, the upper region of that element is in the form of a disk having a chamfered edge 3a. The lateral area of this disk-shape region of the closure piece is such and its edge is formed at such angle that it has the above-noted outwardly tapered fit with the edge 2a of the wall bounding the bottom opening. The lower region of the closure piece is provided by a central post 4 and a plurality of posts 5 spaced around the central post and curved in the horizontal plane, the posts 5 being so spaced that their outer edges lie closely within an area equal to the least diameter of the bottom opening. The posts 5 having their outer edges close to the lower edge of bottom opening 2 serve to center the closure piece for inward and outward movement with respect to the cinder pot cavity. Carried by posts 4 and 5 there is a foot having a marginal region 6a which extends beyond the bounds of the bottom opening. Foot 6 is provided with engaging means, such as a plurality of eyes 6b which project radially beyond the margin of the foot. The eyes 6b provide engagement of the foot by crane hooks, similarly to force the closure piece inwardly of the cinder pot cavity by exerting lifting force counter to the weight of the cinder pot and its contents.

It is desirable to facilitate movement between the closure piece and the matching edge of the bottom opening by coating one of them with a non-ferrous anti-friction metal, such as copper, titanium or the like. Preferably the antifriction coating is applied to the edge bounding the bottom opening and is a thin coating such as those deposited by the so-called "metallizing gun."

Assuming that the cinder pot has received a charge of slag and is in a location to be discharged, it is tilted into discharging position. When the cinder pot is tilted slag which is still liquid is poured and congealed slag which is not adherent to the inner surface of the cinder pot wall falls from the cavity of the pot. For purposes of illustration it will be assumed, however, that a substantial thickness of congealed slag is not detached for discharge by gravity alone. In order to break loose this adherent slag, the closure piece is moved forcefully inwardly of the cinder pot cavity abruptly to exert detaching pressure on the slag mass. In this movement the chamfered edge 3a on the upper region of the closure piece slides on the matching edge which bounds the bottom opening of the cinder pot and the group of posts 5 keep the closure piece centered with respect to the bottom opening. In addition to the function of loosening the adherent slag, unseating the closure piece admits air between the cinder pot wall and the congealed slag to cool the bottom wall of the cinder pot. It may be noted that the spaces 7 between post 4 and posts 5 which carry the foot 6 provide for circulation of air to prevent overheating the closure piece.

The above described movement of the closure piece is limited by the marginal extension of foot 6 beyond the bounds of bottom opening 2, so that the closure piece cannot be forced bodily into the cinder pot cavity. The closure piece 3 thus reseats itself under the influence of gravity on relief of the forces which have caused it to loosen the body of slag in the cinder pot. Desirably the proportioning of the several members or regions of the closure piece is such that the adjacent surfaces of the cinder pot bottom 1a immediately around bottom opening 2 and the marginal region 6a of foot 6 are spaced apart a distance less than or at least not substantially greater than the thickness of the bottom wall in that region, when the closure piece is seated. This preferred proportioning prevents the entrance of substantial fragments of detached slag between the matching edges of the closure piece and the bottom opening to prevent reseating of the closure piece after it has been forced to move inwardly of the cinder pot cavity.

Figs. III and IV of the drawings show the cinder pot mounted in one of the railway carriages commonly used to transport the filled pots to the slag disposal yard. The carriage 8 is of such usual construction as shown, that description of its structure is unnecessary. It may merely be noted that the cinder pot is tiltably mounted in the carriage and that dumping force usually is applied by geared motor-driven connections or by a crane. Fig. III shows the cinder pot tilted into dumping position. In this position a striker member in the form of a massive block of metal 9 has been slid outwardly on rail 10 against the outer member of a pair of fixed stops 11 so that the cinder pot cleans it in swinging to dumping position. When the cinder pot has been dumped and before it is returned to carrying position, the striker member is shifted to a position against the inner element of the two fixed stops 11, in the path of the foot 6 of closure piece 3. By hitting the striker member, closure piece 3 is driven inwardly of the cinder pot cavity to strike against the body of slag therein. The bumping action is repeated, if necessary, until the body of congealed slag in the cinder pot has been detached from the inner surface of the cinder pot wall. The striker member then is retracted and the cinder pot is again swung to discharging position to dump the loosened slag.

If the carriage in which the cinder pot is mounted is not equipped with powered swinging means or if such action appears quicker or more desirable, the cinder pot can be tilted by engagement of a crane hook with one of the eyes 6b or can be lifted a short distance by engagement of a plurality of crane hooks with two or more of the eyes. If the pressure exerted by lifting force applied to the closure piece or the effect of swinging back against the striker member is inadequate to break the body of congealed slag loose from the inner surface of the cinder pot wall, bumping action is obtainable by lifting the cinder pot bodily a short distance and allowing it to fall on a solid surface.

The simplicity and massive structure of the elements added to the primary structure of the cinder pot are particularly to be noted. The closure piece itself is a massive unitary member which is self-seating under the influence of gravity. The striker member which has been shown and described as cooperative with the closure piece to move it inwardly of the bottom opening of the cinder pot also is simple and massive. The avoidance of springs and operating connections of flexible sort is important in connection with steel mill equipment such as cinder pots, which are subjected to rough usage and to possible damage by contact with molten slag and metal.

Whereas the vessel of this invention has been described as a slag or cinder pot primarily for use in operations connected with the making of iron and steel, its utility extends to other analogous operations such as the smelting of various non-ferrous metals, the making of Carborundum and the like.

I claim as my invention:

In the assembly of a vessel for receiving slag and cinder and a carriage in which the said vessel is tiltably mounted, a vessel formed primarily as a casting having a bottom wall with a substantial area thereof omitted to provide a relatively extended bottom opening, a closure piece movable inwardly into the cavity of the said vessel and having an outwardly tapered fit with the embracing edge of the opening in the bottom of the vessel to facilitate seating of the closure piece under gravity, a foot integrated with said closure piece and disposed outside the bottom wall of the said vessel and having a region extended laterally beyond the opening in the said wall to prevent dislodgment of the closure piece from position in the bottom opening by inward movement of the closure piece, the said extended region of the said foot being spaced from the outer surface of the said bottom wall a distance not substantially greater than the thickness of the bottom wall, the said foot of the closure piece being provided with a curved outer striking surface, and a striker member on said carriage in the path of movement of the said foot in swinging movement of the vessel from discharging position back to carrying position.

References Cited in the file of this patent
UNITED STATES PATENTS

| | | |
|---|---|---|
| 663,946 | Waldburger et al. | Dec. 18, 1900 |
| 1,809,872 | Soderberg | June 16, 1931 |
| 1,879,485 | Ramage | Sept. 27, 1932 |
| 2,070,532 | Gathmann | Feb. 9, 1937 |
| 2,070,533 | Gathmann | Feb. 9, 1937 |
| 2,238,750 | Radcliffe | Apr. 15, 1941 |
| 2,241,818 | Johnston | May 13, 1941 |
| 2,290,305 | Westhaver | July 21, 1942 |
| 2,479,364 | Jocelyn | Aug. 16, 1949 |